Jan. 25, 1966  KOJI SHO  3,230,856
MECHANISM FOR SELECTIVELY AUTOMATICALLY AND MANUALLY
ADJUSTING EXPOSURE APERTURES IN PHOTOGRAPHIC CAMERAS
Filed March 23, 1965
FIG. 2
FIG. 1
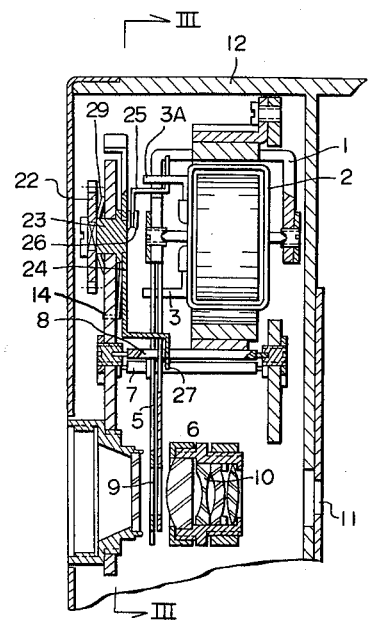
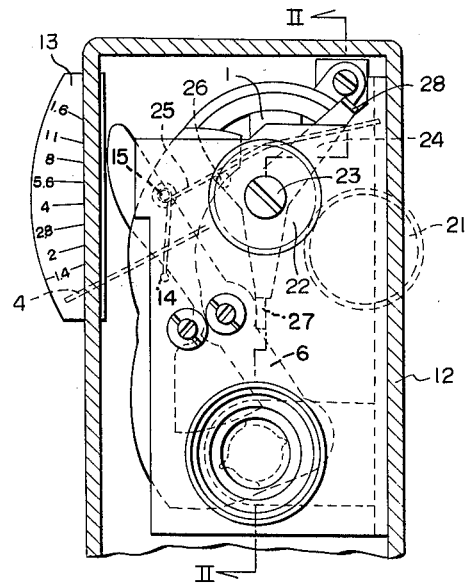
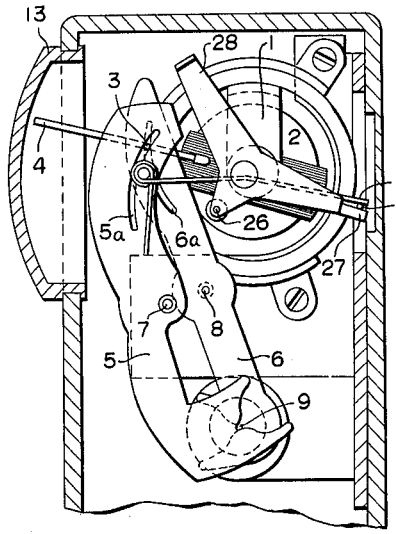
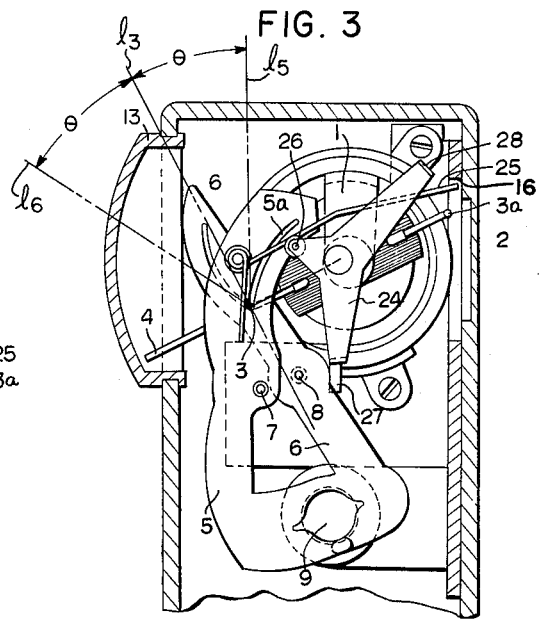
FIG. 4
FIG. 3
INVENTOR.
KOJI SHO
BY
ATTORNEY

United States Patent Office 3,230,856
Patented Jan. 25, 1966

3,230,856
MECHANISM FOR SELECTIVELY AUTOMATICALLY AND MANUALLY ADJUSTING EXPOSURE APERTURES IN PHOTOGRAPHIC CAMERAS
Koji Sho, Yokohama, Japan, assignor to Nippon Kogaku K.K., Tokyo, Japan, a corporation of Japan
Filed Mar. 23, 1965, Ser. No. 444,506
Claims priority, application Japan, May 17, 1960, 35/24,687
14 Claims. (Cl. 95—64)

This application is a continuation-in-part of application Serial No. 94,334, filed March 8, 1961, now abandoned.

This invention relates to apparatus for automatically adjusting the exposure aperture of photographic cameras in accordance with the intensity of light incident upon the photocell in a built-in exposure meter in combination with means for manually adjusting the exposure aperture independently of the intensity of the incident light.

An object of the instant invention is to provide mechanism incorporated in photographic apparatus, for example a still or motion picture camera, in which a relatively large rotary movement of the moving coil of the galvanometer of a built-in exposure meter produces a smaller displacement of the vanes or diaphragms defining the camera exposure aperture thus minimizing the spatial requirements of the mechanism.

Another object is to provide mechanism of the reduction type transmitting movement from the moving coil of a built-in lightmeter to the exposure aperture defining diaphragms while smoothly compensating for the discrepancy, particularly at the lower values of the diaphragm opening, between the angular displacements of the coil and those of the diaphragms.

Still another object of the invention is to provide for smooth changes in the shape and size of the aperture opening as the aperture defining diaphragms are moved by the rotary displacement, manual or automatic, of the movable coil of the exposure meter galvanometer.

Still another object of the invention is to provide a manually operable and simple mechanism enabling clamping of both the moving coil of the exposure meter and the aperture defining diaphragms so that both are protected from vibration and shock from external the camera.

A still further object of the invention is to provide a construction automatically and manually controlling the opening of a variable exposure aperture which is readily assembled, is economical to make, and is of light weight.

The foregoing, and other objects and features of my instant invention will be more readily understood from the following description of an illustrative embodiment thereof when read in conjunction with the appended drawing, in which:

FIGURE 1 is a front view thereof showing the parts relating to the automatic adjustment of the camera exposure aperture;

FIGURE 2 is the sectional view thereof on line II—II of FIGURE 1; and

FIGURES 3 and 4 are the sectional views thereof on line III—III of FIGURE 2, with FIGURE 4 showing, as does FIGURE 1, the position of the parts when the opening of the exposure aperture is automatically controlled, while FIGURE 4 shows such parts as positioned for manual adjustment of the exposure aperture opening.

Referring to the drawing, exposure meter galvanometer 1 is provided with rotatably movable coil 2 which receives energization from a source of electrical energy through the variable resistance of a photoresponsive cell in accordance with the intensity of the light incident thereon, as is well known. Coil 2 has fixed thereto a substantially diametrical crosspiece, one of whose radially extending ends is in the form of a pin 3a with its other radially extending end a pointer 4 having a pin 3 projecting at substantially right angles therefrom and parallel to the axis of rotation of coil 2 at the inner end of pointer 4. Pin 3 extends through an arcuate cam slot 5a in exposure diaphragm, vane or blade 5 as also through arcuate cam slot 6a in the other operture vane 6. Cam slots 5a and 6a are of such arcuate configuration, direction of curvature and position, relative to each other that with pin 3 of the moving coil positioned therein at the region thereof corresponding to the maximum opening of aperture 9, defined by the cut-out portions of diaphragm blades 5 and 6, the angles $\theta$, between tangent $l_3$ to the circular path of pin 3 and the respective tangents, $l_5$ and $l_6$ to cam slots 5a and 6a, are a maximum, with tangent $l_3$ to the circular path substantially coinciding with the bisector angle between tangents $l_5$ and $l_6$ and lying between pivot pins 7 and 8 on which blades 5 and 6 are respectively supported. In other words, the torque transmitted to each exposure aperture-defining blade is equal to that transmitted to the other blade at the minimum, substantially closed, aperture 9 and smooth actuation of the blades is obtained under the relatively feeble rotary force exerted by the galvanometer coil of the exposure meter. The end regions of both blades 5 and 6 in which the respective arcuate cam slots 5a and 6a are cut, are opposite the blade end regions provided with mutually facing cut-out portions which together define exposure aperture 9. Each blade is substantially L-shaped, with blade 5 supported on and pivotable about pin 7 at the center of gravity of the blade, as clearly shown in FIGURES 1, 3 and 4, so that the blade is movable with minimum friction, is in perfect balance at any rotated position, and requires but minimum force to rotate it about pin 7. Blade 6 is similarly supported on, and pivotable about, pin 8 located at the centre of gravity of blade 6, and thus functions in similar manner. The enlarged base portions of each blade, the lower free ends in the figures, are positioned to swing into the path of light incident on camera objective 10, the facing edge regions, axially overlapping each other, being cut away in smooth predetermined curves to form, as stated, aperture 9 aligned with the axis of photographic objective 10 and camera fixed aperture 11 at all times. The cut-away portions are of such predetermined shape as to form apertures variable in size substantially in direct proportion to the angular rotation of the blades, and generally of a wedge-like shape with curved bounding faces, for example, ovate biconical or ovate pyriform, as shown in FIGURE 3.

As shown in FIGURES 1, 3 and 4, an enclosure 13 of transparent material extending from a side wall of camera body 12 and carrying thereon a scale of relative apertures with values in ascending order, the values being indicatable by pointer 4, with the lowest relative aperture corresponding to the maximum rotary deflection of coil 2, permits observation of the indication by pointer 4 from exterior the camera. Knob 21, rotatable from externally the camera body, extends from the camera side opposite to that from which transparent enclosure 13 protrudes, and meshes with gear 22 for rotation of shaft 23 and angle lever 24 integral therewith. Spring 25 is anchored at its one end 14 in a portion of the camera body and looped at an intermediate portion about fixed pin 15 extending from the camera body, the free end of spring 25, which is prebiased so that if such end were free it would move clockwise, and which faces and is spaced from shoulder 16, being blocked from such movement by extension 26 on lever 24, the extension 26 in the normal position of lever 24 being in the path of clockwise movement of spring 25 and resting thereagainst.

For automatic adjustment of aperture 9, lever 24 retains the position shown for it in FIGURES 1 and 3 due to plate spring 29 which presses against gear 22 with a frictional force sufficient to prevent any clockwise rotational tendency on gear 22 due to spring 25 pressing on extension 26 of lever 24, thus also preventing the free end of spring 25 from engaging pin 3A, maintaining such free end out of the arcuate path of pin 3A as coil 2 rotates clockwise (FIGURES 1 and 3) in response to the ambient light incident on the photocell of the exposure meter.

When, however, manual adjustment of exposure aperture 9 is to be utilized, knob 21 is rotated clockwise thus rotating gear 22 and lever 24 counterclockwise against, and overcoming, the frictional force of plate spring 29. With angle lever 24, and hence extension 26 thereon, rotated counter-clockwise (FIGURE 4), extension 26 moves away from spring 25, of which the free end now due to the prebias imparted to spring 25, moves clockwise, while simultaneously, and as stated, lever 24 is moving counter-clockwise as is bent-over portion 27 likewise integral with lever 24. Thus the free end of spring 25 and bent-over portion 27 clamp pin 3A between them, and coil 2 is thus resiliently held in that spring 22 bears against pin 3A. Hence on further rotation of gear 21 manually, and thus gear 22, in either direction with pin 3A so clamped, aperture 9 may be opened to any degree within its range up to its maximum opening, noting that on such maximum opening being had on manual rotation of coil 2 counter-clockwise the second bent-over arm 28 integral with lever 24 will be prevented from further counter-clockwise rotation on engagement with the top of diaphragm blade 5, while simultaneously the free end of spring 25 strikes shoulder 16 thus preventing injury to either pin 3A or bent-over portion 27. It will be noted also that when coil 2 is rotated its maximum clockwise, that is, to maximum opening of aperture 9, further rotation is prevented by bent-over portion striking blade 6 at, as shown in FIGURE 3 (for automatic aperture control, but equally true for manual control thereof) a raised central portion of the blade.

It will be noted that when pin 3A is first clamped between spring 25 and lever arm 27, pin 3 rotated clockwise moved upwardly in cam slots 5a and 6a to about the midlength of both slots, thus closing aperture 9. On counter-clockwise rotation of coil 2 from this position, by clockwise rotation of knob 21 as above stated, aperture 9 can be opened to any desired degree, up to its maximum, and when pin 3 engages the lower end of both slots, aperture 9 is fully open with coil 2 restored to its position of zero rotation. Since at the zero rotational position of galvanometer coils there is no load on the hair spring (not shown in the drawing for simplicity thereof but well known as required from the prior art for proper operation of galvanometer coils of exposure meters), the camera mechanism so positioned is protected from injury by external vibration and shock when not in use or transporting it.

Obviously, the structure of the instant invention has such favorable characteristic features as requiring smaller space for its installation in cameras, of the miniature type or otherwise, as compared to prior known discoid exposure aperture vanes, blades or diaphragms; the arcuate displacement of the exposure aperture blades of the invention is less than the arcuate displacement of the coil of the built-in exposure meter; the automatic operation of the exposure aperture blades may be readily interchanged with manual operation thereof, and the shape of exposure aperture is such that finer adjustment at the lower and minimum aperture openings is possible rather than solely at the larger and maximum aperture openings as is possible with prior known automatic aperture adjusting devices. In addition and contrast to prior known devices no electrical switch needs be operated, opened or closed as the case may be, when exposure aperture adjustment is to be shifted from automatic to manual, or vice versa, and the inventive structure though simple in structure is positive in operation and has important built-in safety features.

What I claim is:

1. A mechanism for varying the magnitude of the exposure aperture of a camera objective selectively manually and automatically, the camera having a built-in exposure meter including a rotatable coil, comprising a pair of exposure aperture blades for the camera objective, a first pin extending from the rotatable coil, means for rotating the rotatable coil, an arcuate cam slot in each exposure aperture blade of the pair, and a pair of laterally spaced fixed pins in the camera of which each pin pivotally supports an aperture blade of the pair at the center of gravity of the supported blade, each blade having a cut-away portion of wedge-like shape with curved elongated sides diverging in the outward direction of the blade and overlapping the cut-away portion of the other blade, the cut-away blade portions facing each other, the first pin extending into the arcuate slots of both blades and oscillating the blades on rotation of the coil.

2. The mechanism according to claim 1 in which when the cut-away portions of the blades are oscillated to form the minimum, substantially closed, aperture, the first pin is positioned at substantially the midlength region of both arcuate slots.

3. The mechanism according to claim 1 in which when the cut-away portions of the blades are oscillated to form the maximum opening of the aperture, the first pin is at an end region of both arcuate slots.

4. The mechanism according to claim 1 in which the arcuate cam slot in each blade is curved in the same direction, is in each blade in the portion thereof to the opposite side diametrically of its center of gravity of its portion having the cut-away portion, and the first pin extends through both that when the blades are oscillated to form the maximum open aperture between the cut-away portions, the tangent to the circular path of the first pin at its such position bisects the angle formed by the tangents to the two arcuate slots at such position of the first pin and passes the midpoint between the pair of laterally spaced fixed pins.

5. The mechanism according to claim 1 in which the curvature of the two arcuate slots is greater than the curvature of the arcuate circular path of the first pin on rotation of the coil to angularly displace the blades in an amount less than the coil is angularly displaced.

6. The mechanism according to claim 1 in which a prebiased elongated spring has a free end, a fixed shaft mounted in the camera, an angle arm rotatable about the fixed shaft, a second pin extending from the rotatable coil, the angle arm being normally positioned to bear against the prebiased spring to hold it out of the path of rotation of the first and second pins, and means for manually rotating the angle arm from its normal position in one direction to release the spring and permit the free end of the spring to engage the second pin to rotate the coil in the direction opposite to the one direction of angle arm rotation and clamp the second pin to the angle arm and upon so clamping the second pin the means for manually rotating the angle arm enable rotation of the coil thereby in either direction.

7. The mechanism according to claim 6 in which a flat friction spring bears against the angle arm with a force sufficient to prevent rotation of the angle arm solely under the force of the free end of the prebiased elongated spring on release thereof but insufficient to prevent rotation of the angle arm when the means for manually rotating the angle arm are manually actuated.

8. The mechanism according to claim 6 in which the second pin extends from the coil substantially diametrically opposite to the coil region from which the first pin extends.

9. The mechanism according to claim 8 in which when the released free end of the elongated spring and the angle arm clamp the second pin, the first pin is at the position in both arcuate slots at which the blades are oscillated to the minimum, substantially closed, aperture position.

10. The mechanism according to claim 6 in which a radial extension having a bent-over end portion integral with the angle lever is adapted on rotation of the coil in said one direction with the second pin clamped between the angle arm and the elongated spring at a predetermined region of its rotational path to strike an end of one blade and be stopped from further rotation in said one direction, said predetermined region corresponding to a point somewhat before the first pin strikes an end of both arcuate slots completely to open the exposure aperture.

11. The mechanism according to claim 6 in which the means for manually rotating the angle arm comprises a first gear rotatable from externally the camera and a second gear wholly within the camera meshing with the first gear and connected to the angle arm, and the fixed shaft is substantially coaxial with the axis of rotation of the coil.

12. A mechanism for selectively controlling the aperture opening of the photographic objective of a camera with built-in exposure meter including a rotary coil responsive to electric currents from the photo-responsive cell of the exposure meter in dependence on said currents and selectively independently of said currents, comprising a pair of complementary diaphragm vanes having similarly shaped portions at one end together defining an exposure aperture, each vane having a curved slot in its other end, one of the vanes underlying the other so that the slots intersect at similarly located points thereof, two separately spaced pivots for respectively individually mounting each vane of the pair at its center of gravity, a first pin extending radially from the coil and having a portion extending perpendicularly through both slots at the intersection thereof for rotating the vanes on their pivots at equal rates, a second pin extending radially from the coil at a region thereof substantially diametrically opposite the first pin, and rotary means substantially coaxial with the axis of rotation of the coil for clamping the second pin in the rotated position of the coil at which the first pin has oscillated the vanes to define the closed minimum condition of the exposure aperture, and manual means for rotating the clamping means and the coil clamped thereto by the clamping of the second pin to oscillate the vanes to any desired opening of the exposure aperture independently of current in the coil.

13. A mechanism for selectively controlling the opening of the exposure aperture of the photographic objective of a camera with a built-in exposure meter including a rotary coil responsive to electric currents from the photo-responsive cell of the exposure meter in dependence on said current and independently of said currents, comprising a pair of complementary diaphragm vanes having similarly shaped portions at their lower end region defining the exposure aperture, each vane having a curved slot in its upper end region, one of the vanes underlying the other so that the slots intersect at similarly located points thereof, two separate laterally spaced pivots for individually mounting each vane of the pair at its respective center of gravity, a first pin extending from the rotary coil and perpendicularly through both vane slots at the intersection thereof for rotating the vanes on their respective pivots, a second pin extending from the rotary coil at a region thereof opposite to the region from which the first pin extends, an angular lever having at least two radially extending arms, a shaft substantially coaxial with the axis of rotation of the rotary coil, the angular lever being rotatable on the shaft, a formed spring having a free end and prebiased to rotate the angular lever in a first direction when the spring free end is unblocked, a first one of the angular lever arms normally blocking movement of the free end of the formed spring, a friction plate spring bearing against the angular lever with a force in excess of that exertable by the formed spring preventing rotation of the angular lever solely under the force thereon of the formed spring, and gearing including one gear manually rotatable from externally the camera for rotating the angular lever in either direction which on rotation of the angular lever in the direction opposite said first direction unblocks the free end region of the formed spring to push the second pin ahead of it in the first direction ultimately to clamp the second pin between itself and the second arm of the angular lever at the rotated position of the coil at which the first pin has rotated the vanes to their closed minimum exposure aperture position, the gearing on further manual rotation adjusting the exposure opening to any desired value independent of current in the coil so long as the second pin is so clamped.

14. The mechanism according to claim 13 in which the angular lever has a third radial arm having a bent over portion and spaced from its other arms, the third arm being adapted to engage at least one of the vanes to prevent further rotation of the angular lever and the rotary coil in the direction opening the exposure aperture when the latter is at its fully open maximum position.

References Cited by the Examiner

UNITED STATES PATENTS 3,122,980    3/1964    Hautmann _____ 95—64

FOREIGN PATENTS 1,330,203    5/1963    France.
859,892      1/1961    Great Britain.

NORTON ANSHER, *Primary Examiner.*